Feb. 20, 1951     A. J. McCLELLAND     2,542,421
MACHINE TOOL

Filed Sept. 11, 1945     5 Sheets-Sheet 1

INVENTOR.
ALEXANDER J. McCLELLAND
BY
Kwis Hudson Boughton & Williams
ATTORNEYS

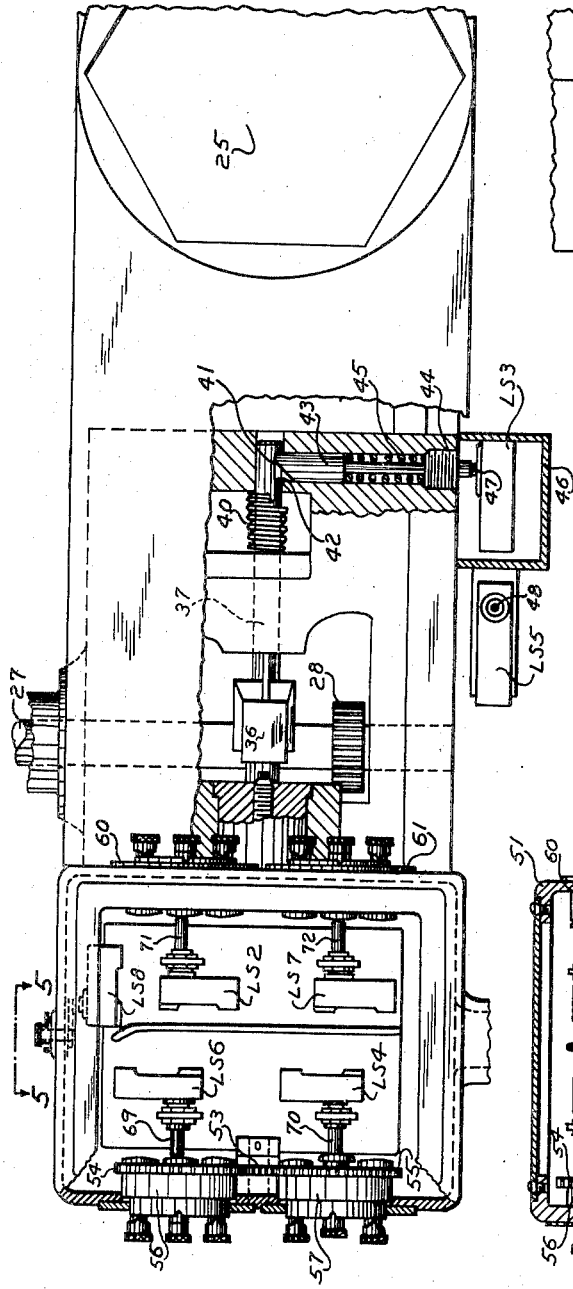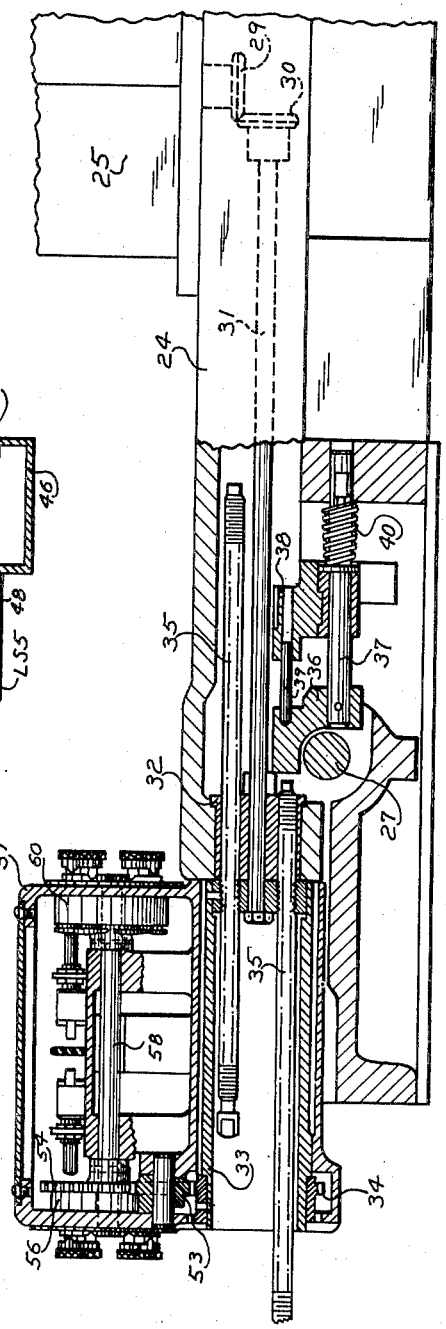

Feb. 20, 1951     A. J. McCLELLAND     2,542,421
MACHINE TOOL

Filed Sept. 11, 1945     5 Sheets-Sheet 3

INVENTOR.
ALEXANDER J. McCLELLAND
BY
Kwis Hudson Boughton & Williams
ATTORNEYS

Patented Feb. 20, 1951

2,542,421

UNITED STATES PATENT OFFICE 2,542,421

MACHINE TOOL

Alexander J. McClelland, Cleveland, Ohio, assignor to The Warner & Swasey Company, Cleveland, Ohio, a corporation of Ohio Application September 11, 1945, Serial No. 615,604

2 Claims. (Cl. 29—64)

This invention relates to a machine tool and particularly to a machine tool adapted to perform rapid machining and threading operations upon relatively small work pieces, although the invention may be advantageously employed in machine tools for machining different types of work pieces.

The machine tool disclosed herein and to which the inventive subject matter hereof is applied is of the type disclosed in the applications of Robert H. Clark, Serial No. 490,468, filed June 11, 1943 and Serial No. 674,894, filed June 6, 1946. The said Clark application Serial No. 490,468, issued August 13, 1946, as Patent No. 2,405,686. The said Clark application Serial No. 674,894, issued October 31, 1950, as Patent No. 2,528,299. In the said Clark applications the machine tool disclosed employs a reversible variable speed electric motor for driving the spindle, while the slide is provided with an indexible turret. Also in the machines disclosed in said applications means are provided for controlling the speeds, the direction of rotation and the starting and stopping of the motor for each step of a work cycle and this means can be preset and then actuated in part by the indexing of the turret and in part by the movements of the slide.

An object of the present invention is to arrange the means just referred to in such a way as to facilitate the presetting thereof, in that the elements of said means which are adjustably preset are located in an accessible position within convenient reach of the operator.

A more detailed object of the invention is to arrange said means so that the elements thereof above referred to are located in substantially the same horizontal plane, with said plane disposed at an elevation within easy view and reach of the operator.

A further object of the invention is to so arrange said means to provide a compact disposition thereof, with a resultant improvement in the general outline of the machine tool and particularly of the turret slide thereof.

Further and additional objects and advantages of the invention not hereinbefore referred to will become apparent during the detailed description of an embodiment thereof which is to follow.

Referring to the accompanying drawings,

Fig. 3 is an enlarged plan view of the turret slide viewed from the rear of the machine with certain parts broken away and with certain parts shown in section.

Fig. 4 is a partial rear elevational view and partial vertical longitudinal sectional view of the turret slide shown in Fig. 3 with the section taken on irregular line 4—4 of Fig. 7 looking in the direction of the arrows.

Figure 1:
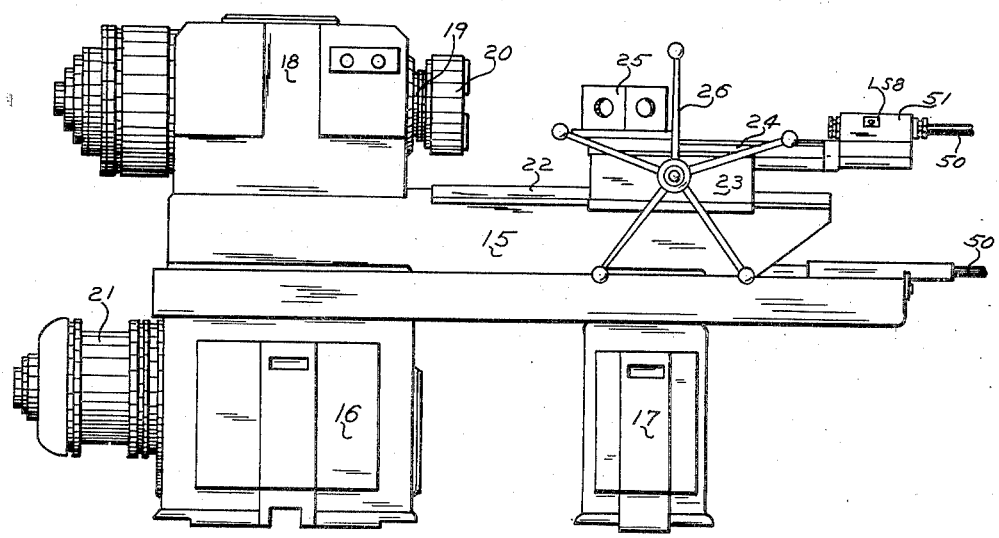
Fig. 1 is a front elevational view of a machine tool embodying the invention.
Figure 2:
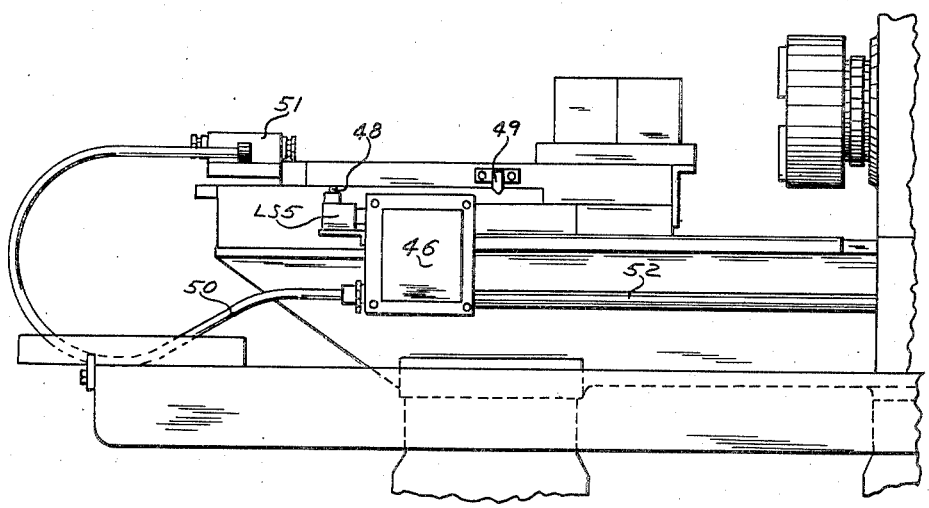
Fig. 2 is a fragmentary rear elevational view of the machine tool shown in Fig. 1 but on a larger scale.

Referring to Figs. 1 and 2, the machine tool shown therein is a turret lathe and comprises a bed 15 supported on spaced pedestals or legs 16 and 17. A headstock 18 is carried by one end of the bed 15 and rotatably supports the work spindle 19 and chuck 20 and which spindle is driven by a reversible variable speed electric motor 21 supported by the leg 16 and operatively connected with the spindle 19 by suitable means as will be well understood.

The bed 15 is provided with longitudinally extending ways 22 which are parallel to the axis of the work spindle 19 and adjustably support a base 23 on which base slides a turret slide 24 having on its end adjacent to the chuck 20 an indexible turret 25. The base 23 can be moved to and clamped in adjusted position on the ways 22 as will be well understood while the slide 24 is manually moved along the ways of the base by means of a turnstile 26 fixed to a shaft 27 which carries a pinion 28, see Fig. 3, and is rotatably supported in the base, with said pinion meshing with a rack carried by the turret slide as is well known in the art.

The turret 25 may be indexed automatically by the movement of the slide and locked and clamped in indexed position by well known mechanism not necessary to illustrate herein. The central stud of the indexible turret 25 extends into the slide 24 and has fixed thereto a bevel gear 29 which meshes with a bevel gear 30 fixed to one end of a shaft 31 that is parallel to the ways 22. The shaft 31 extends rearwardly within the slide 24 and passes through and is fixed to a stop roll 32 and said stop roll has secured to it a rearwardly extending sleeve 33, the rear end of which is rotatably supported in the slide. The sleeve 33 adjacent its rear end is provided externally with a gear 34 fixed to the sleeve to rotate therewith. It will be noted that the stop screws 35 which are threaded into the stop roll 32 can be inserted through the sleeve 33 and are readily accessible for adjustment through the open end of said sleeve. It will be understood that the stop screws 35 correspond in number to the number of faces of the indexible turret 25.

It will be seen that when the turret 25 is indexed the stop roll 32 will also be indexed to bring one of the stop screws 35 into alignment with a movable stop member 36. The stop member 36 is fixed to a cam rod 37 which is slidably supported in a portion of the base that is provided with a positive stop lug 38 against which the movable stop member 36 abuts after it has been moved by the stop screw which is in alignment therewith. The positive stop lug 38 is provided with a recess which slidably receives a pin 39 carried by the movable stop member 36, wherefore said member and the rod 37 are held against relative rocking movement.

It will be seen that when the slide 24 moves forwardly toward the chuck 20 the movable stop member 36 will be engaged by one of the stop screws 35 as the slide approaches its limit of forward movement and during the remainder of the forward movement of the slide for non-threading operations the movable stop member 36 will be moved into engagement with the positive stop lug 38 and the forward movement of the slide thus positively arrested.

This movement of the movable stop member 36 compresses a coil spring 40 which surrounds the rod 37 between a collar fixed to the rod and a portion of the base 23. The rod 37 has its right hand end, as viewed in the drawings, slidably supported in a bore formed in the base 23 for a purpose later to be pointed out, see Figs. 3 and 4. The rod 37 is provided with a stepped recessed cam portion for the purpose of controlling the motor 21 during threading operations, with the lowermost part 41 of said portion connected to a raised part by an inclined camming surface 42. The base 23 is also provided with a bore which communicates perpendicularly with the bore in which the cam rod 37 slides and said bore slidably supports a cam plunger 43 which has a reduced portion extending through a shouldered bushing 44 and outwardly of the base 23, said bushing serving as an abutment for one end of a coil spring 45 which surrounds the reduced portion of the plunger and has its opposite end abutting the enlarged portion thereof.

The reduced portion of the camming plunger 43 extends outwardly of the bushing 44 at the rear of the machine and into a housing 46 secured to the rear side of the base. The housing 46 contains a limit switch LS3 which is actuated by a switch button 47 aligned with the outwardly extended end of the reduced portion of the cam plunger 43. The switch LS3 is a normally open switch and it will be seen that when the inner end of the cam plunger 43 is engaging the lowermost part 41 of the rod 37 said switch remains open but when the end of the plunger 43 engages and rides up the surface 42 of the rod 37 the plunger 43 has been depressed against the spring 45 sufficiently to cause its reduced outwardly extending end to depress the switch button 47 and close the switch LS3. It will be understood that as soon as the pressure of the plunger 43 on the switch button 47 is relieved the switch LS3 opens under spring action. As will later be explained control mechanism including a holding circuit functions in conjunction with the switch LS3 for threading operations.

The switch box or housing 46 has fixed to its outer and left hand side, as viewed in Fig. 3, a switch LS5, the switch button 48 of which is depressed momentarily at a predetermined point in the forward and rearward movements of the slide by a dog 49 fixed to the side of the slide. The switch LS5 is of the same type as the switch LS3 and the electrical conduits from the switches LS3 and LS5 extend from the switch box 46 through a flexible cable 50 to a housing 51 carried by the rear end of the slide 24, see Figs. 1 and 2. The conduits in the cable 50 are connected to switches later to be referred to and contained within the housing 51. It will be understood after the explanation hereinafter set forth that the switches LS3 and LS5 are suitably connected in the control circuit of the motor 21 by conduits which extend from the switch box 46 through a tube 52.

The switches contained in the housing 51 are five in number, with switches LS2, LS4, LS6, and LS7 actuated by mechanism later to be described and which is indexed with the turret and stop roll 32 while the "high speed reverse" switch LS8 is a manually actuated switch, see Figs. 3 and 4. The switches LS2, LS4, LS6 and LS7 are located substantially in the same horizontal plane within the housing 51.

Figure 7:
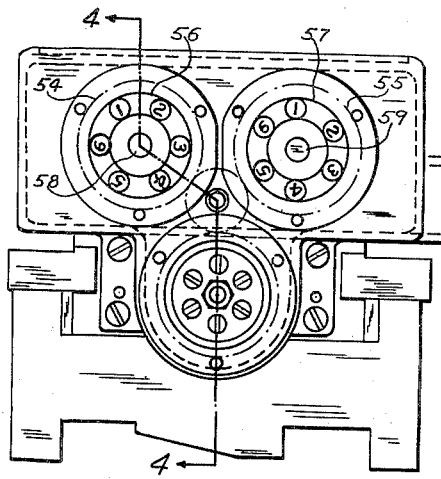
Fig. 7 is an end elevational view taken looking from the left hand side of Fig. 4.
Figure 5:
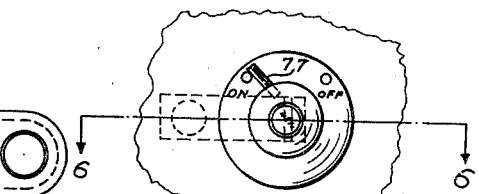
Fig. 5 is a fragmentary front elevational view taken from line 5—5 of Fig. 3 looking in the direction of the arrows.

As previously stated the sleeve 33 which is fixed to the stop roll 32 is provided with a gear 34, see Fig. 4, and said gear meshes with an idler pinion 53 rotatably supported in the housing 51 and above the longitudinal center line of the slide 24, see Figs. 3, 4 and 7. The pinion 53 meshes with spur gears 54 and 55. The gears 54 and 55 are formed on similar drums 56 and 57 and said drums are fixed to similar shafts 58 and 59 arranged parallel to each other in a horizontal plane and rotatably supported in suitable bearings formed in the housing. The shafts extend forwardly toward the turret 25 and parallel to the ways 22 and have secured on their forward ends drums 60 and 61 similar to each other and to the drums 56 and 57. It will be observed that the drums 56, 57, 60 and 61 are located in the same horizontal plane with the drums 56 and 57 extending through openings in the side wall of the housing at the rear end of the slide and the drums 60 and 61 extending through openings in the side wall of the housing that is adjacent to the turret 25. The drum 56 is the "start and stop" control drum, the drum 57 is the "high and low speed" control drum, the drum 60 is the "automatic reverse" control drum, and the drum 61 is the "thread selector" drum.

It will be seen that the outer end faces of all of the drums are located outwardly of the side walls of the housing and in the same horizontal plane and at a convenient height and thus are readily accessible to and within easy reach of the operator of the machine. The drums are each provided with six equally spaced circularly arranged recesses 62 facing inwardly of the housing 51, it being understood that six such recesses are referred to because the turret is a six-sided turret and there will be six operative steps in a work cycle. Obviously a greater or lesser number of recesses might be provided according to the number of steps in the work cycle.

The drums each carry six identical cam disks 63 formed on shouldered portions of shafts 64 and which portions slidably interfit recesses 62 of the drums, while the shafts slidably pass through openings in the drums to the outer faces thereof. On the outer ends of the shafts 64 buttons 65 are secured and said buttons are provided on their inner faces with radially extending V-shaped ridges 66 which are adapted to co-operate when in aligned position with complementary grooves 67 formed in the outer faces of the drums. Coil springs 68 surround the shafts 64 within the recesses 62 and act normally to urge the shouldered portions of the shafts and the cam disks 63 in a direction inwardly of the housing.

From the description heretofore set forth it will have been noted that each indexing movement of the turret 25 produces an indexing movement of the stop roll 32 and through the gear 34, pinion 53, gears 54 and 55 and shafts 58 and 59 a simultaneous and corresponding indexing movement of the spools 56, 57, 60 and 61.

In each indexed position of the spools one of the cam disks 63 of each spool will be aligned with the switch button of its cooperating switch, that is, the switches LS6, LS4, LS2 and LS7 are provided, respectively, with switch buttons 69, 70, 71 and 72 which are aligned in each indexed position of the drums, respectively, with cam disks of drums 56, 57, 60 and 61.

It will be understood that when a shaft 64 of any of the drums is shifted by its knob 65 to allow the V-shaped ridge 66 thereof to engage in its cooperating notch 67 then the spring 68 causes the cam disk 63 of said shaft to be moved inwardly of the housing 51 and into a position wherein when the drum is indexed said cam disk will engage its switch button to depress the same and actuate the switch. As soon as the drum is again indexed and said cam disk moves out of alignment the switch button returns to its former extended position. Assuming that the succeeding shaft 64 of the drum has been retracted against the action of the spring 68 and held in retracted position by the engagement of the ridge 66 with the outer face of the drum, then as the drum indexes the cam disk of said succeeding shaft does not contact and hence will have no effect on the switch button. It will be understood that the shafts 64 of each of the drums are correlated to the different operative steps of the work cycle and the knobs carried thereby correspondingly numbered and will be preset in accordance with whether or not the switches cooperating with the drums are to be actuated in the respective operative steps. Although the switches LS6, LS4, LS2 and LS7 are not all of the same type their switch buttons are all spring returned to extended position when not engaged and depressed by a cam disk.

Figure 6:
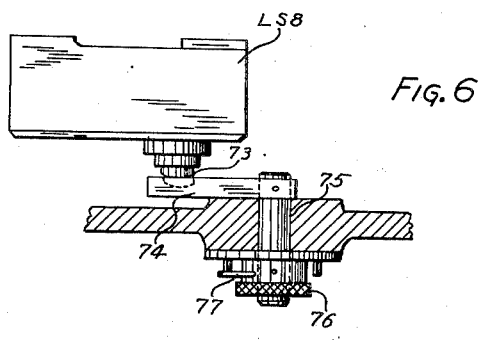
Fig. 6 is a fragmentary partial plan and partial sectional view, with the section taken along line 6—6 of Fig. 5 looking in the direction of the arrows.
Figure 8:
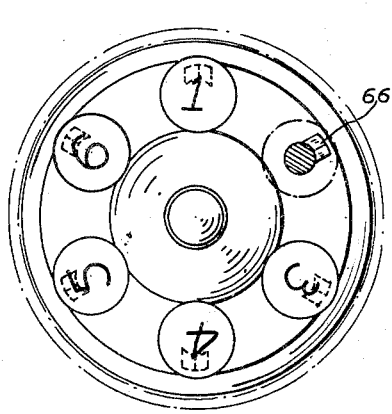
Fig. 8 is an enlarged detail view of one of the indexible drums shown in Fig. 7.
Figure 9:
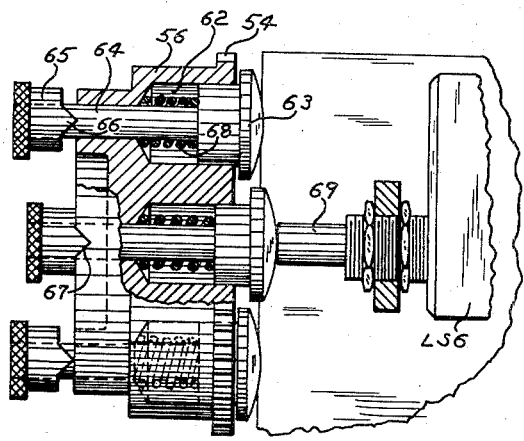
Fig. 9 is a fragmentary plan view of one of the drums and the switch actuated by the buttons of said drum, with certain portions shown in section.

The switch LS8 also located in the housing 51 adjacent to the front wall thereof is a manually operated switch. The switch LS8, as will later be explained, is a double contact switch and the switch button 73 thereof is normally held in extended position by spring action and when so held one pair of contacts of said switch is closed and such position is designated as the "off" position. When the switch button 73 is depressed the other pair of contacts is closed and the first pair is open and this position is designated as the "on" position, as will later be pointed out. The switch button 73 is depressed by means of a wiper arm 74 which is fixed to the inner end of a shaft 75 rockably mounted in the front wall of the housing 51 and provided on its outer end with an operating knob 76 which knob carries a stop pin 77 adapted to engage either one of a pair of stops defining the "on" and "off" positions of the switch LS8. In Fig. 6 the switch button 73 is indicated as depressed and hence the switch LS8 is in the "on" position.

Figure 10:
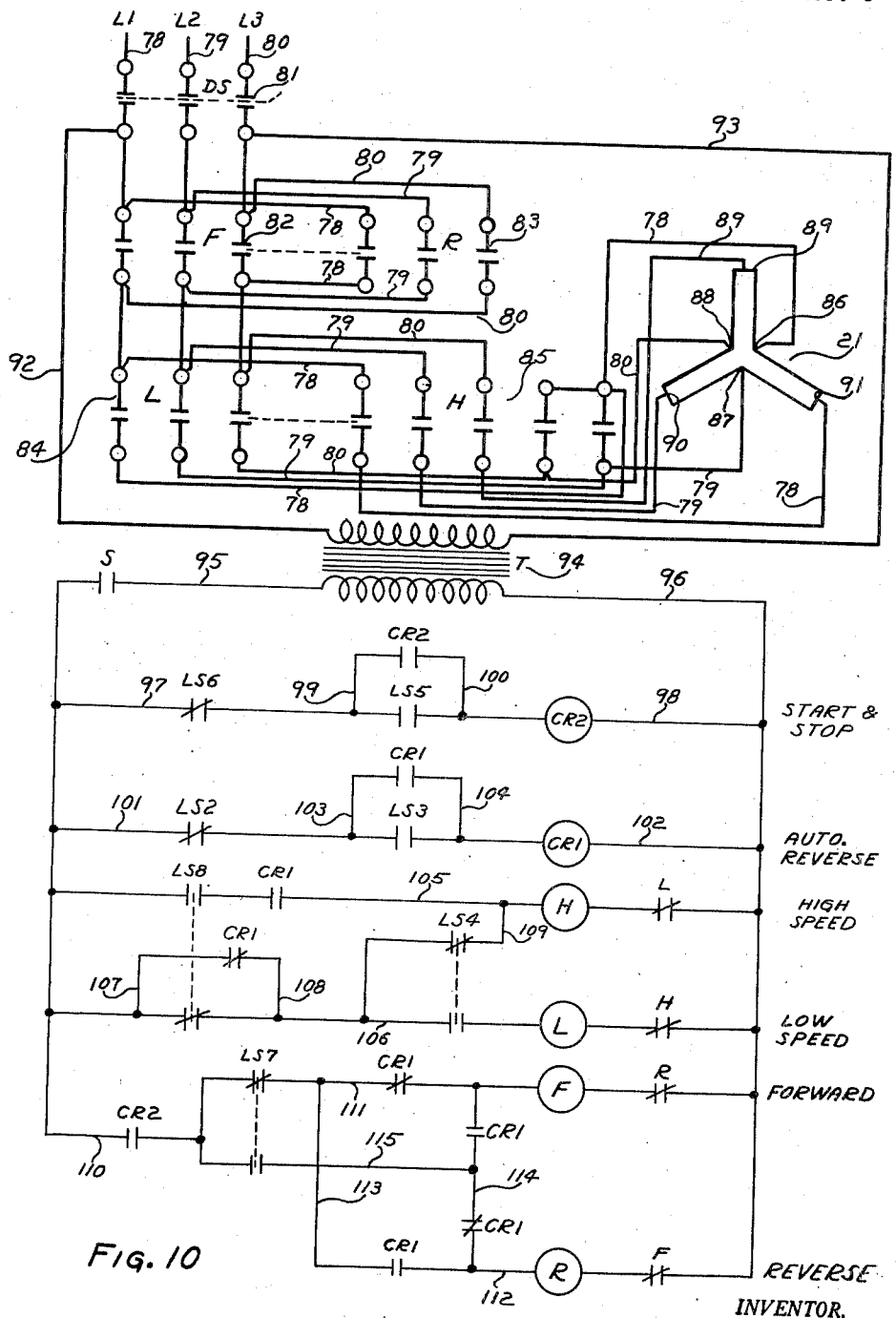
Fig. 10 is a cross-the-line diagrammatic illustration of the motor and control circuits laid out in accordance with the standardized practice of the American electrical industry.
Figure 11:
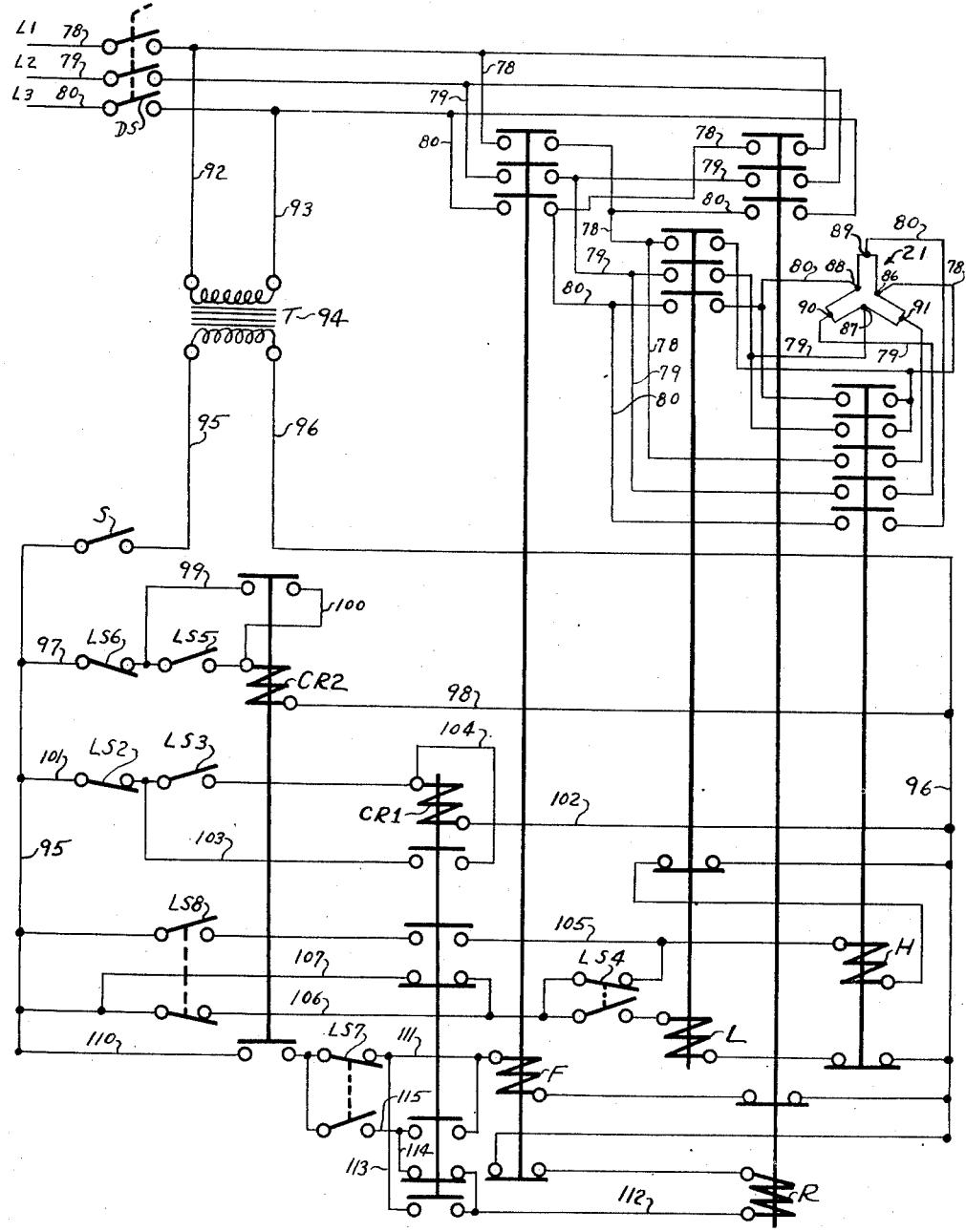
Fig. 11 is a diagrammatic illustration of the motor and control circuits of Fig. 10 but laid out in accordance with Patent Office standards.

Referring to Fig. 10 the wires 78, 79 and 80 constitute a multiphase circuit from a suitable source of electrical energy and this circuit includes a main disconnecting switch 81. The wires 78, 79 and 80 lead to the three contacts of the forward contactor 82 and also to three contacts of the reverse contactor 83. After the forward contactor 82 is engaged the circuit is extended by the three primary wires 78, 79 and 80 to three contacts of the low speed contactor 84. Also the wires 78, 79 and 80 are extended to three of the five contacts of a high speed contactor 85. The wire 78 when the low speed contactor is closed extends to one of the contacts of the fifth pair of contacts of the high speed contactor 85 and thence to the inner terminal 86 of the motor 21. Also when the low speed contactor 84 is closed the wire 79 extends to the other contact of the fifth pair of contacts of the high speed contactor 85 and thence to the inner terminal 87 of the motor. Under the same condition the wire 80 extends to one of the contacts of the fourth pair of contacts of the high speed contactor 85 and thence to the inner terminal 88 of the motor. The other contact of the fourth pair is connected to the contact of the fifth pair to which the wire 78 is connected. Consequently it will be seen that when the forward contactor 82 and the low speed contactor 84 are closed the three inner terminals 86, 87 and 88 of the motor are connected in the primary circuit and the coils of the motor are energized for forward low speed operation of the motor. When the reverse contactor 83 is closed and the forward contactor 82 is open while the low speed contactor 84 remains closed, it will be seen that the wire 78 and the wire 80 are electrically connected to the terminals 86 and 88 of the motor in a reverse arrangement and consequently the motor 21 will operate at low speed in the reverse direction.

Assuming that the forward contactor 82 is closed, low speed contactor 84 is opened and high speed contactor 85 is closed, then the circuit to the motor by the wires 78, 79 and 80 extends, respectively, to the outer terminals 91, 90 and 89 of the motor, while the inner terminals 86, 87 and 88 of the motor have been connected in an endless circuit by those portions of the wires 78, 79 and 80 leading from the fourth and fifth pairs of contacts of the high speed contactor to said three inner terminals as will be well understood in the art. When this condition obtains the coils of the motor are energized to effect high speed forward operation of the motor. Assuming that forward contactor 82 is opened and reverse contactor 83 is closed with high speed contactor 85 remaining closed and low speed contactor 84 remaining open, it will be evident that the motor 21 will operate at high speed in the reverse direction.

The wires 78 and 80 of the motor circuit are connected by wires 92 and 93 to the primary of a transformer 94, the secondary of which is connected to wires 95 and 96 of the control circuit, wherefore electric energy at a reduced voltage for said control circuit is obtained from the transformer when switch S in wire 95 is manually closed. A solenoid CR2 is connected by wires 97 and 98 to the wires 95 and 96, the contacts of normally open limit switch LS5 being connected to wires 97 and 98. The wires 99 and 100 connected to wires 97 and 98 are also connected to two contacts of contactor CR2 and when switch LS5 is momentarily closed and solenoid CR2 energized, contactor CR2 closes and a holding circuit is established. The normally closed switch LS6 is in the wire 97. Wires 95 and 96 are also connected by wires 101 and 102 to the solenoid CR1 and to the contacts of normally open limit switch LS3, it being noted that normally closed limit switch LS2 is in wire 101. Wires 103 and 104 connected, respectively, to wires 101 and 102 and to two of the contacts of contactor CR1 constitute a holding circuit for switch LS3 when the latter has been momentarily closed and solenoid CR1 energized.

The wires 95 and 96 are interconnected by a high speed circuit 105 and by a low speed circuit 106. The solenoids H and L for actuating the high speed contactor 85 and the low speed contactor 84 are located in said circuits respectively. Normally closed interlock switches L and H are in the circuits 105 and 106, respectively, and switch L is opened when solenoid L in the low speed circuit is energized and switch H is opened when the solenoid H in the high speed circuit is energized. High speed circuit 105 and low speed circuit 106 each contain a pair of contacts of the double contact limit switch LS8. Wires 107 and 108 together with normally closed contacts of contactor CR1 constitute a holding circuit for the low speed circuit 106, said normally closed contacts CR1 being actuated by solenoid CR1 in wire 102 of the automatic reverse circuit. A wire 109 interconnects the high speed circuit 105 and the low speed circuit 106 and a pair of contacts of the double contact limit switch LS4 are located in wire 109, the other pair of contacts of said switch being located in low speed circuit 106 intermediate the wire 109 and solenoid L. Wires 110 and 111 interconnect the wires 95 and 96 and form part of the forward control circuit. Wire 112 of the reverse control circuit is interconnected with wire 111 by wires 113 and 114, with said wire 114 also being connected by wire 115 with wires 110 and 111. Wire 111 contains normally closed interlock switch R while wire 112 contains normally closed interlock switch F. The solenoid F for actuating forward contactor 82 is located in wire 111 and when said solenoid is energized normally closed interlock switch F in wire 112 is opened. The wire 112 contains solenoid R for actuating reverse contactor 83 and when said solenoid is energized the normally closed interlock switch R in wire 111 is opened. A pair of normally open contacts of contactor CR2 is located in wire 110 and is closed when solenoid CR2 in wire 98 is energized. Double contact limit switch LS7 has a pair of its contacts in wire 111 and a pair thereof in wire 115. Contactor CR1 has a pair of normally closed contacts in wire 111 and a pair of normally open contacts in wire 112. Also contactor CR1 has a pair of normally open contacts and a pair of normally closed contacts in wire 114. The normally closed contacts of contactor CR1 are opened and the normally open contacts of CR1 are closed when solenoid CR1 in wire 102 is energized.

In order to explain the utility of the drums 56, 57, 60 and 61 and the cam disks 63 on the shafts 64 carried by said drums and which disks operate the limit switches LS6, LS4, LS2 and LS7, the operation of the machine will be set forth. Assuming that the first operative step of the work cycle requires rotation of the spindle in the forward direction at high speed and that the slide has been moved to its most rearward position and the turret has been indexed to No. 1 position, then if the operator closes the disconnect switch 81 power is applied to the motor circuit and when he closes switch S in wire 95 power is applied to the control circuit. If button No. 1 of drum 56 has been positioned outwardly normally closed limit switch LS6 remains closed. Also if button No. 1 of drum 61 has been positioned outwardly then normally closed contacts of limit switch LS7 in wire 111 will remain closed and the normally open contacts of said switch in wire 115 will remain open. Also at this time No. 1 button of drum 57 should be in its most outer position so that the normally closed contacts of limit switch LS4 in wire 109 remain closed while the normally open contacts of said switch in wire 106 remain open. At this time No. 1 button of drum 60 should be in its inward location so that normally closed switch LS2 is now open. Assuming that the operator has moved the knob 76 to position the stop pin in "off" position, then the normally open contacts of switch LS8 in wire 105 are open and the normally closed contacts of said switch in wire 106 are closed. The operator now by means of the turnstile moves the slide in the forward direction and as the dog 49 passes across the button 48 of switch LS5 this switch is momentarily closed, whereupon since switch LS6 is closed solenoid CR2 in wire 98 is energized and contactor CR2 is closed, thus completing the holding circuit around switch LS5. The closing of the contactor CR2 causes current to flow through wires 110 and 111, energizing coil F in wire 111 to close the forward contactor 82 in the motor circuit and to open interlock contacts F in wire 112. It will be recalled that the No. 1 button of drum 61 is out and therefore the normally closed contacts of switch LS7 in wire 106 remain closed. Also current flows through the normally closed contacts of switch LS8 in wire 106 and through the normally closed contacts of switch LS4 in wire 109 and thence through wire 105 of the high speed control circuit to energize solenoid H of the high speed contactor 85 in the motor circuit to close said contactor, the solenoid H also acting to open interlock contacts H in wire 106. The motor is now operating in the forward direction at high speed and the operator continues to move the slide forwardly by the turnstile until the said movement is stopped by a stop screw of the stop roll, at which time switch LS3 is closed, but since No. 1 button of drum 60 is positioned inwardly then switch LS2 is held open and solenoid CR1 is not energized and thus the automatic reverse control circuit is not completed by the closing of switch LS3 and the motor continues to operate in the forward direction at high speed, The operator now moves the slide rearwardly by the turnstile and during such rearward movement limit switch LS5 is momentarily closed but this has no effect since the holding circuit for said switch is still closed and the motor continues to operate in the forward direction at high speed. Near the end of the rearward movement of the slide the turret indexes to No. 2 position for the second operative step and at the same time the stop roll indexes as do the four drums carried by the housing 51. Assuming that the second step calls for forward low speed rotation of the spindle, then the No. 2 button of drum 56 should be in its outward position so switch LS6 remains closed during the second step. Also the No. 2 button of drum 61 should be out so that limit switch LS7 is not actuated during the second step. The No. 2 button of drum 57 is in inward position so that limit switch LS4 will be actuated for the second step. Also No. 2 button of drum 60 will be positioned inwardly for the second step so that normally closed limit switch LS2 will be held open during this step. We now have the condition that when the drums index with the turret for the commencement of the second step switch LS6 remains closed, switch LS2 is open, normally closed contacts of switch LS7 in wire 111 remain closed and normally open contacts of said switch in wire 115 remain open while the normally closed contacts of switch LS4 in wire 109 are opened and the normally open contacts of said switch in wire 106 are closed, thus establishing the low speed control circuit and causing the motor to operate forwardly at low speed. The operator now turns the turnstile to move the slide forwardly and this effects an idle momentary closing of switch LS5 since the holding circuit for said switch is still active and the motor continues to operate in the forward direction at low speed. At the end of the machining operation for the second step the operator again moves the slide rearwardly to cause the turret, the drums and the stop roll to index into their positions for the third operative step. Assuming that the third operative step calls for a right hand threading operation, then button No. 3 of drum 56 should be out to allow switch LS6 to remain closed during the third step. Also button No. 3 of drum 61 should be out so that switch LS7 is not actuated and the normally closed contacts thereof in wire 111 remain closed. In addition button No. 3 of drum 57 should be in so that switch LS4 is actuated for the third step and the normally closed contacts of said switch in wire 109 are opened and the normally open contacts thereof in wire 106 are closed. In addition, the No. 3 button of drum 60 should be positioned outwardly so that the normally closed limit switch LS2 remains closed during the third step, in order to effect automatic reversal of the spindle rotation at the end of the threading operation. The operator now moves the slide forwardly and during this movement switch LS5 is idly momentarily closed and the motor continues to operate in the forward direction at low speed. Near the end of the threading operation and near the end of the forward movement of the slide the No. 3 stop screw causes switch LS3 to be closed and since switch LS2 is closed solenoid CR1 in wire 102 is energized, thus closing normally open contacts of contactor CR1 in the holding circuit formed by the wires 103 and 104. At the same time normally closed contacts of the contactor CR1 in wire 111 are opened and normally open contacts of this contactor in wire 112 are closed, whereupon solenoid F in wire 111 is deenergized and interlock contact F in wire 112 closed while forward contactor 82 in the motor circuit opens. It will be seen that current now flows from wire 111 through wire 113 and 112 whereupon solenoid R in wire 112 is energized thus opening interlock contacts R in wire 111 and closing the reverse contactor 83 of the motor circuit and thus the motor is operating in the reverse direction at low speed.

Assuming that the fourth step calls for left hand threading, then button No. 4 of drum 56 will be out and switch LS6 remains closed, button No. 4 of drum 61 will be in and switch LS7 actuated to open contacts in wire 111 and close contacts in wire 115, button No. 4 of drum 57 will be in so switch LS4 is actuated to open normally closed contacts in wire 109 and close normally open contacts in wire 106 and button No. 4 of drum 60 will be out so switch LS2 is not actuated and remains closed. Therefore when the operator moves the slide forwardly the motor continues operating at low speed in the reverse direction to enable left hand threads to be produced upon the work. When the threading operation is nearly completed and No. 4 stop screw has actuated switch LS3 to close the same and energize solenoid CR1, then the motor commences to operate in the forward direction at low speed to effect a backing off of the left handed tap.

From the foregoing it will be seen that by adjusting or presetting the buttons of the different drums certain predetermined or preselected motor operations can be obtained for each operative step of the cycle and that once the setting of the buttons has occurred the operator can cause the machine to function in the same manner through a number of work cycles upon a succession of similar work pieces. Although every setting heretofore referred to of the buttons on drum 56 has called for the buttons being in outward position so as to effect no actuation of switch LS6, it will be understood that during certain of the indexing movements of the turret it may be desirable, as for purposes of loading and the like, to stop the motor and in such cases the buttons on drum 56 will be set in their most inward position, wherefore upon indexing of the drum 56 switch LS6 will be actuated and solenoid CR2 deenergized and contactor CR2 in wire 110 is opened and both forward and reverse motor control circuits are interrupted and contactors 82 and 83 take a neutral position. Heretofore, the switch LS8 has been described as in the "off" position, wherefore the "backing off" after a threading operation at low speed has been at low speed. When it is desired to have the "backing off" at high speed the switch LS8 is set in the "on" position, that is, the contacts of said switch in wire 105 are closed and the contacts thereof in wire 106 are opened. Thus when solenoid CR1 is energized, then contacts CR1 in wire 105 are closed and contacts CR1 in wires 107, 108 are opened and the motor operates in reverse at high speed.

Inasmuch as the setting of the buttons of the drums controls the operation of the machine for the different operative steps of the work cycle, the location of these drums and the facility with which the buttons thereof may be preset is an important consideration in the efficient operation of the machine. As already pointed out, the drums 56, 57, 60, 61 and the control knob 76 for switch LS8 are located in a horizontal plane clearly visible to the operator and readily accessible and within easy reach for set-up purposes.

Although a preferred embodiment of the invention has been illustrated and described herein, it will be understood that the invention is susceptible of various modifications and adaptations within the scope of the appended claims.

Having thus described my invention, I claim:

1. A preselecting and actuating mechanism for control switches of a machine tool drive and comprising a support adapted to be mounted on a slide of the machine tool and including bearing portions, a plurality of parallel shafts rotatably mounted in said bearing portions with their axes in a common horizontal plane, control switches mounted on said support, a pair of drums mounted on each shaft adjacent to the opposite sides of said support and rotatable with said shafts and provided with presettable switch actuating means adapted to operatively cooperate with certain of the control switches, the said presetting means of one drum of each pair being accessible at one side of the support and the said preselecting means of the other drum of each pair being accessible at the opposite side of the support, rotatable means carried by the support and adapted to be actuated in timed relationship with the indexing rotation of a turret on the slide, and operative connections on said support between said last named means and said shafts for rotating the latter in timed relation to said last named means.

2. A preselecting and actuating mechanism for control switches of a machine tool drive and comprising a housing support adapted to be mounted on the upper side of a slide of the machine tool and including side walls on its opposite sides and bearing portions within said housing, a plurality of parallel shafts rotatably mounted in said portions with their axes in a common horizontal plane, control switches mounted in said housing support, a pair of drums mounted on each shaft adjacent to opposite side walls of said housing and rotatable with said shafts and provided with presettable switch actuating means adapted to operatively cooperate with certain of the control switches, the said presetting means of one drum of each pair being accessible from the exterior of one side wall of the housing support and the said preselecting means of the other drum of each pair being accessible from exteriorly of the opposite side wall of the housing support, means carried by the housing support and adapted to be actuated in timed relationship with the indexing rotation of a turret on the slide, and operative connections within said housing between said last named means and said shafts to rotate the latter in timed relation to said last named means.

ALEXANDER J. McCLELLAND.

REFERENCES CITED

The following references are of record in the file of this patent:

UNITED STATES PATENTS

| Number | Name | Date |
|---|---|---|
| 2,384,809 | Bullard et al. | Sept. 18, 1945 |
| 2,405,686 | Clark | Aug. 13, 1946 |